United States Patent [19]

Bethge et al.

[11] Patent Number: 4,669,250
[45] Date of Patent: Jun. 2, 1987

[54] DEVICE FOR ATTACHING A SCREW CAP TO A CONTAINER

[75] Inventors: Gerhard Bethge, Cologne; Albert Schmitz, Kürten-Eichhof, both of Fed. Rep. of Germany

[73] Assignee: Robert Bosch GmbH, Stuttgart, Fed. Rep. of Germany

[21] Appl. No.: 830,822

[22] Filed: Feb. 19, 1986

[30] Foreign Application Priority Data

May 22, 1985 [DE] Fed. Rep. of Germany ....... 3518338

[51] Int. Cl.$^4$ ........................... B67B 1/06; B65B 7/28
[52] U.S. Cl. .................................................. 53/331.5
[58] Field of Search ...................... 53/331.5, 367, 368, 53/317

[56] References Cited

U.S. PATENT DOCUMENTS

| 3,955,341 | 5/1976 | Wilhere | 53/367 X |
| 4,364,218 | 12/1982 | Obrist | 53/331.5 |
| 4,494,358 | 1/1985 | Zalkin | 53/331.5 |

Primary Examiner—Horace M. Culver
Attorney, Agent, or Firm—Edwin E. Greigg

[57] ABSTRACT

A device for attaching screw caps to containers has a screwing head driven by an electric motor. To avoid a high peak torque in tightening screw caps, the screwing head is coupled with the drive motor via a soft torsion coupling, which absorbs the energy of the masses that continue to rotate. The torsion coupling is embodied as a tube of a resilient elastomer. The screw cap is prevented from loosening as the masses revolve backward by means of a reverse movement stop which is associated with the screwing head.

5 Claims, 1 Drawing Figure

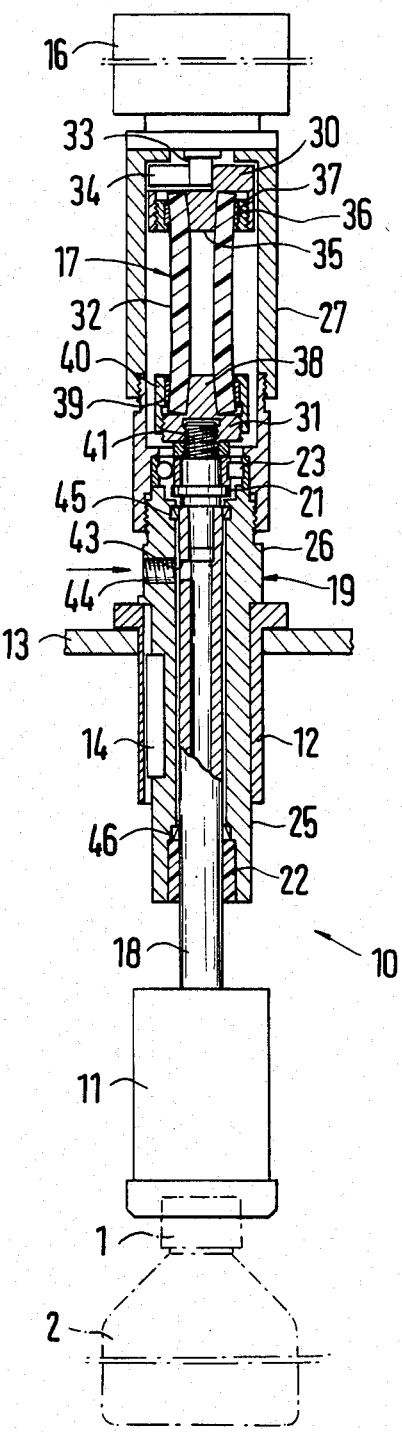

DEVICE FOR ATTACHING A SCREW CAP TO A CONTAINER

BACKGROUND OF THE INVENTION

The invention is based on a device for attaching a screw cap to a container as defined hereinafter. In a device of this type known for instance from German Offenlegungsschrift No. 33 36 041, a slip coupling is disposed in the screw head, and if a predetermined capping and screwing torque is exceeded it releases the rotational connection with the driving motor. Additionally, the known device has detectors for ascertaining the rotational speed and the current supplied to the driving motor, as well as for measuring the torque applied. A device of this kind is expensive, and in the heavy-duty operation typical in bottling plants it tends to malfunction.

OBJECT AND SUMMARY OF THE INVENTION

The device for attaching a screw cap to a container as defined has the advantage over the prior art of a simple structure, which stands up to heavy-duty use. Also, with it screw caps can be tightened to uniform tightness on bottles, canisters, and similar containers, in which the angle of rotation from the beginning of the tightening operation until the cap has stopped turning is very minimal and the time available for this operation is very short. The resilient and therefore rotationally soft torsion coupling changes the otherwise typical "hard" screwing operation into a "soft" screwing operation by increasing the rotational angle; this assures secure tightening of the cap. The backward movement block prevents the cap from loosening if the drive motor is shut off and the energy stored in the resilient torsion coupling tends to rotate the rotating masses backward.

In a particularly advantageous feature of the invention, the torsion coupling is embodied as a torsion spring, in particular one made of a resilient elastomer, such as polyurethane. The torsion spring is preferably in the shape of a tube, the two ends of which are fastened onto conical tangs.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing is a cross sectional view of a device for attaching screw caps onto containers.

DESCRIPTION OF THE PREFERRED EMBODIMENT

A container capping machine has one or preferably a plurality of screwing units 10 having a screwing head 11 for gripping cap-like screw closures 1 and for screwing them onto filled containers, for instance bottles 2. The screwing unit 10, oriented vertically, is seated in an axially displaceable manner on a flanged sleeve 12 of an arm 13 that can be raised and lowered. The screwing unit 10 is secured against twisting by an adjusting spring 14. By lowering the arm 13, the screwing unit 10 and a screw cap 1 previously grasped by its screwing head 11 are moved to a filled bottle 2. The screwing head 11, known per se, is actuated with compressed air in order to grasp a screw cap 1.

In addition to the screwing head 11, the screwing unit 10 includes a drive motor 16, a coupling 17 joining the drive motor 16 with the screwing head 11, and a spindle 18, as well as a sleeve-like, multi-part housing 19. The spindle 18 and the coupling 17 are rotatably supported in the housing 19, which is inserted into the flanged sleeve 12. The spindle 18, which on its lower end bears the screwing head 11, is embodied as hollow so that compressed air can be passed through it to the screwing head, and on its upper end it is closed with a stepped shaft segment 21. The spindle 18 is rotatably supported at the bottom in a slide bearing 22 and at the top, with the shaft segment 21 joined to it in a rotationally fixed manner, in a combined reverse stop and roller bearing 23; this element 23 is both a pivot bearing and a freewheeling means or one-way coupling of a type known per se, which allows the spindle 18 to rotate in only one direction but blocks it in the other rotational direction, which is the one counter to the screwing-on direction. The housing 19 is made up of three parts threaded together, of which the lower housing sleeve 25 is arranged to receive the slide bearing 22, the middle housing sleeve 26 receives the reverse stop and roller bearing 23, and the upper housing sleeve 27 is adapted to surround the coupling 17 and support the drive motor 16.

The coupling 17 is a torsion spring in the form of a tube segment 32 of annular cross section, made from a resilient elastomer, such as polyurethane, the ends of which are secured in grippers 30, 31. The upper gripper 30 is joined in a rotationally fixed manner to the drive shaft 33 of the drive motor 16 with a clamping element 34. The gripper 30 has a conical tang 35 that protrudes axially downward, onto which the upper end of the tube segment 32, having been spread open, is drawn and clamped firmly by a conical clamping sleeve 36, which is retained by a screw ring 37 that is threaded into the gripper 30. The lower end of the tube segment 32 is also seated on a conical tang 38, which protrudes axially upward from the other gripper 31. The other gripper 31 is threaded in a rotationally fixed manner onto a stub shaft 41 of the segment 21 that is secured on the spindle 18.

To deliver compressed air to the screwing head 11 through the spindle 18, the spindle 18 has a radial bore 43, and the lower housing sleeve 25 has a bore 44. The radial gap between the interior of the outer housing sleeve 25 and the spindle 18 is sealed off with seals 45, 46.

The drive motor 16 is preferably an electric motor with a step-down gear, which shuts off automatically if a predetermined torque is exceeded or if a predetermined current intensity is drawn.

OPERATION

The device described above functions as follows:

First, a screw cap 1 is inserted into the head 11, and then a filled bottle 2 is moved beneath the screwing unit 10 having the head 11. When the bottle 2 and the screwing unit 10 are axially aligned, either by moving the bottle toward the screwing head or by lowering the screwing unit 10, the drive motor 16 is switched on. As the screwing head 11 rotates, the screw cap 1 grips the threaded neck of the firmly-held bottle 2 and reaches its seating point within one turn, or in only a few turns; this point is when the seal of the screw cap meets the rim of the bottle opening. Only a relatively low torque needs to be brought to bear by the drive motor 16 before this seating point is reached, and accordingly it draws a relatively small amount of current. Since as a rule screw caps for containers have a steep thread and little compression, and the point at which the screw cap takes its seat to when it is screwed tight is very short, and the rotational angle required for this is very small (known as a "hard" screwing operation). Once the final tightening moment is reached, the rotational movement of the screwing head 11 and spindle 18 is stopped; however, because of the tube segment 32 acting as a resilient coupling, the rotating coupling, the rotating masses of the drive motor 16 and its gear can continue to rotate. On the other hand, because the supply of current to the drive motor 16 is shut off when the final tightening moment is attained, these masses soon come to a stop. The energy stored during the braking of these masses in the elastic tube segment 32 then has the effect of rotating these masses backward. To prevent the screw cap 1 that has now been screwed tightly onto the bottle 2 from loosening again during this backward rotation, the reverse stop and roller bearing 23 blocks the spindle 18 and the screwing head 11 in this rotational direction. By providing a soft torsion coupling and a free-wheeling means in the screwing unit 10, the otherwise "hard" screwing operation is transformed into a "soft" screwing operation.

It should also be noted that a resilient tube segment is not the only possible embodiment of a torsion coupling; other types of torsion springs, appropriately adapted, can also be used, such as resilient rods or helical springs made of steel.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A device for attaching a screw cap to a container, comprising a rotatabe screwing head arranged to receive said screw cap and a drive motor affixed to said screwing head via a coupling, said coupling further including a resilient elastomer torsion means fastened in place at each end and between said drive motor and said screwing head and a one-way coupling reverse movement stop means associated with said screwing head.

2. A device as defined by claim 1, in which said resilient elastomer is a tube.

3. A device as defined by claim 2, in which said tube has opposite end portions each of which are arranged to receive a conical tang, said tang and each said end portion being firmly fastened to a conical sleeve.

4. A device as defined by claim 3, in which said elastomer torsion means is made of polyurethan.

5. A device as defined by claim 2, in which said elastomer torsion means is made of polyurethane.

* * * * *